United States Patent
Inserra Imparato et al.

(10) Patent No.: US 8,298,359 B2
(45) Date of Patent: Oct. 30, 2012

(54) METHOD FOR RECYCLING SCRAPS OF PREPREG MATERIALS

(75) Inventors: Sabato Inserra Imparato, Gragnano (IT); Giuseppe Pace, Bacoli (IT); Luigi Capasso, San Giorgio a Cremano (IT); Eugenio Villella, S. Anastasia (IT); Luca Di Tommaso, Marano di Napoli (IT); Carmine Rota, Naples (IT); Emmanuele D'Agostino, Naples (IT); Marco Fassero, Leini' (IT)

(73) Assignee: Alenia Aeronautica S.p.A., Pomigliano D'Arco, Naples (IT)

( * ) Notice: Subject to any disclaimer, the term of this patent is extended or adjusted under 35 U.S.C. 154(b) by 472 days.

(21) Appl. No.: 12/674,630

(22) PCT Filed: Jul. 24, 2008

(86) PCT No.: PCT/IT2008/000500
§ 371 (c)(1),
(2), (4) Date: Feb. 22, 2010

(87) PCT Pub. No.: WO2010/010584
PCT Pub. Date: Jan. 28, 2010

(65) Prior Publication Data
US 2011/0036481 A1 Feb. 17, 2011

(51) Int. Cl.
*B29C 65/00* (2006.01)
*B29C 65/02* (2006.01)
*B29C 73/00* (2006.01)
*B32B 37/00* (2006.01)
*B32B 38/00* (2006.01)
*B32B 43/00* (2006.01)
*B32B 38/04* (2006.01)

(52) U.S. Cl. ............ 156/94; 156/64; 156/263; 156/301; 156/303

(58) Field of Classification Search .................... 156/60, 156/62.2, 62.4, 62.8, 63, 64, 75, 94, 148, 156/196, 212, 221, 250, 256, 259, 263, 264, 156/265, 267, 276, 297, 299, 300, 301, 302, 156/303, 308.2, 308.6, 324, 324.4
See application file for complete search history.

(56) References Cited

U.S. PATENT DOCUMENTS 5,164,255 A 11/1992 Weeks

FOREIGN PATENT DOCUMENTS

| EP | 1 134 314 A1 | 9/2001 |
|---|---|---|
| EP | 1134314 A1 * | 9/2001 |
| FR | 2 740 149 | 4/1997 |
| WO | WO 2004/030906 A1 | 4/2004 |

* cited by examiner

*Primary Examiner* — Philip Tucker
*Assistant Examiner* — Brian R Slawski
(74) *Attorney, Agent, or Firm* — Merchant & Gould P.C.

(57) ABSTRACT

A method for manufacturing a recycled prepreg material in strip form, is composed of fiber sections embedded in a resin matrix. A charge of flat scraps from a prepreg starting material is supplied, recording the overall area of the scraps. Then the scraps are fragmented by cutting so as to obtain cut fragments of predetermined size. A strip of backing material and a strip of protective material are supplied. The cut fragments are then distributed in a random manner on the strip of backing material, the feeding speed of the strip of backing material being adjusted depending on the recorded area of the input scraps, so that the cut fragments form a substantially homogeneous layer. The strip of protective material is then arranged over the cut fragments distributed on the strip of backing material, and the whole assembly is then compacted so as to form a strip of recycled prepreg material.

8 Claims, 3 Drawing Sheets

METHOD FOR RECYCLING SCRAPS OF PREPREG MATERIALS

This application is a National Stage Application of PCT/IT2008/000500, filed 24 Jul. 2008, and which application is incorporated herein by reference. To the extent appropriate, a claim of priority is made to the above disclosed application.

BACKGROUND OF THE INVENTION

The present invention relates generally to the sector of machining prepreg materials.

As is known, the machining of composite parts results in a considerable amount of waste during cutting of the prepreg material. In fact the "buy-to-fly" ratio (that is to say, the ratio of the material purchased for the production of a given part to that actually used) varies between 1.2:1 and 3.5:1 depending on the type of machining operation and the part to be manufactured.

Most of the scraps (more than 70% thereof) takes the form of unpolymerized material and involves a considerable cost for disposal thereof. In fact, these materials which contain unpolymerized epoxy resins must be disposed of as special waste. Therefore, in addition to the high cost of the raw material (about 50 Euros per kg) there is the cost necessary for disposal.

SUMMARY OF THE INVENTION

In the light of this problem, the invention relates thereof a method for manufacturing a recycled prepreg material in strip form, composed of fibre sections embedded in a resin matrix, said method comprising the following steps:

supplying an input charge of flat scraps from a prepreg starting material composed of continuous fibres embedded in a tack resin matrix, recording the overall area of the scraps of said input charge;

fragmenting said scraps by means of cutting so as to obtain cut fragments of predetermined size;

supplying a strip of backing material and a strip of protective material, which are fed at a controlled feeding speed;

distributing in a random manner said cut fragments on said strip of backing material, the feeding speed of said backing material being adjusted depending on the recorded area of the input scraps, so that said cut fragments form a substantially homogeneous layer in which the fibres are distributed in a near-isotropic manner with respect to the surface of the strip of backing material;

arranging said strip of protective material over the cut fragments distributed on the strip of backing material; and compacting said strip of protective material, cut fragments and strip of backing material so as to form a strip of recycled prepreg material which has a substantially constant area weight and thickness.

According to the invention a process for converting scraps from a prepreg material with continuous (unidirectional or woven) fibres into a recycled material which is also prepreg, but has broken fibres of sufficient length (for example about 20 mm) to maintain high mechanical properties with near-isotropic characteristics is therefore proposed. This material can then be stratified so as to obtain the desired thickness and hot-formed and polymerized using the conventional vacuum-bag technology in order to produce primary structure aeronautical parts (such as window frames, where the loads require a near-isotropic behaviour of the material) or secondary structure aeronautical parts (system supports, air-conditioning components, etc.).

Another application may relate to structural components for the automobile industry, railway industry or sports articles.

Finally it is possible to use the abovementioned material in order to produce by means of rolling and polymerization a surface which can be machined so as to produce tools for stratification and polymerization of composite parts.

As regards certain aspects of the method according to the invention it must be pointed out that, according to the present state of the art, processes for producing prepreg materials containing short fibres distributed in a near-isotopic manner in a resin matrix are known. An example of these processes is described in EP 1 134 314. However, none of the known processes considers recycling the scraps resulting from machining of the prepreg materials.

BRIEF DESCRIPTION OF THE DRAWINGS

A preferred, but non-limiting embodiment of the invention will now be described with reference to the accompanying drawings in which.

DETAILED DESCRIPTION OF THE PREFERRED EMBODIMENTS

Figure 1:
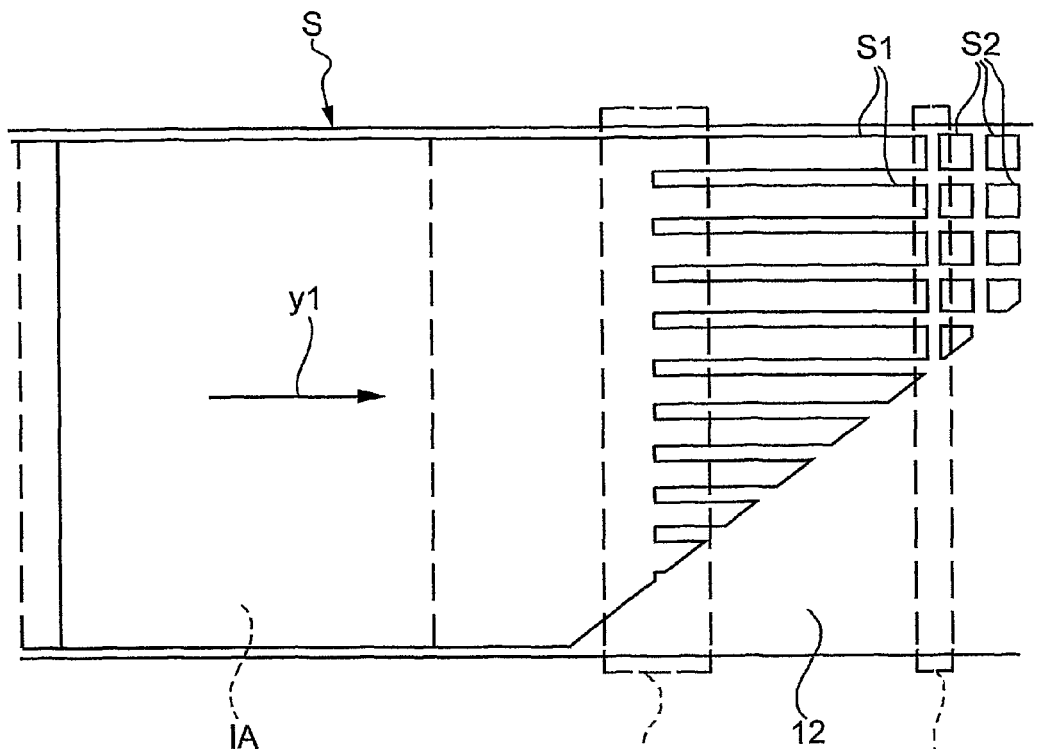
FIG. 1 is a plan view of a typical scrap used as starting material in the method according to the invention.

A method for manufacturing a prepreg material in strip form from scraps resulting from the machining of prepreg material will now be described. A typical scrap is shown in FIG. 1. The material obtained with the method according to the invention is composed of fibre sections embedded in a resin matrix. In the example described below, reference will be made in particular to an unpolymerized thermosetting resin.

Figure 3:
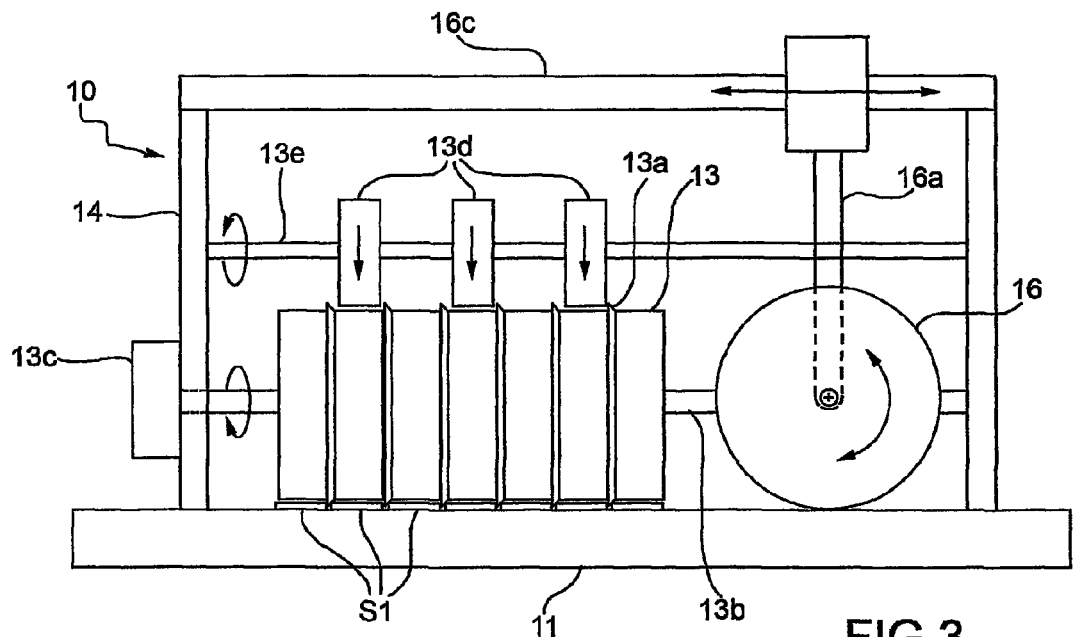
FIG. 3 is a schematic front view of a cutting machine which can be used in a method according to the invention.
Figure 4:
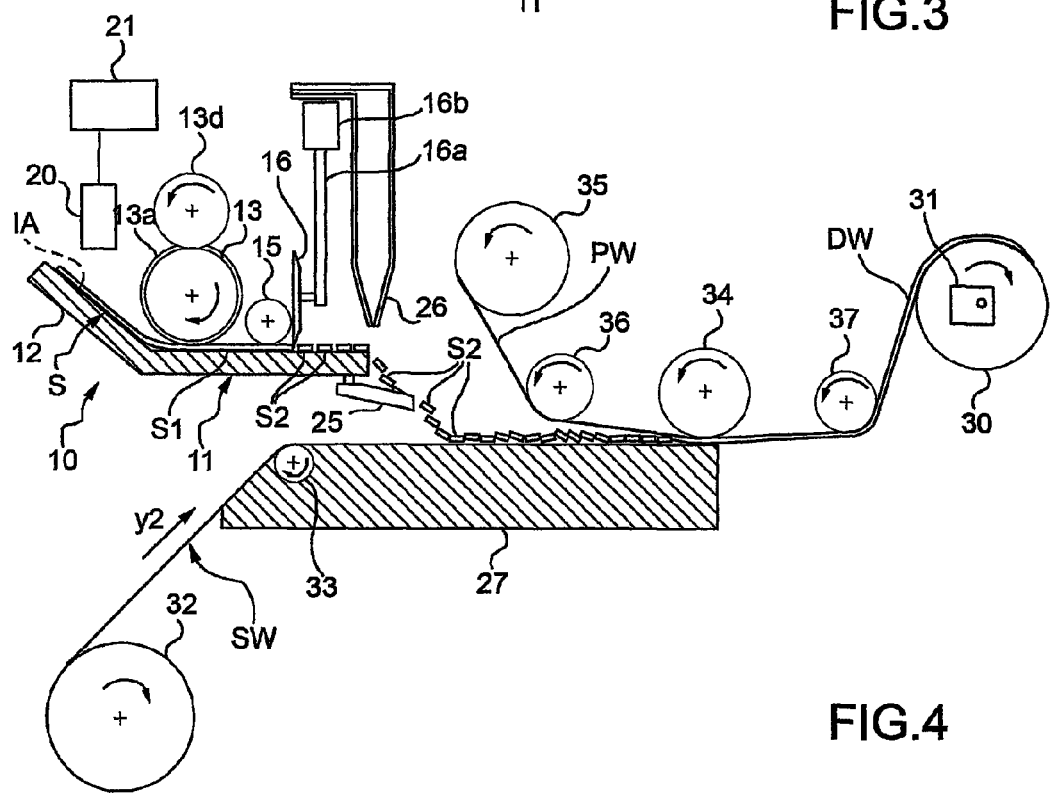
FIG. 4 is a schematic view which shows an apparatus for implementing a method according to the invention.

An example of an apparatus suitable for implementing a method according to the invention is shown in FIGS. 3 and 4. This apparatus comprises, upstream relative to the direction of the process flow, a cutting machine 10 which is shown in more detail in front view in FIG. 3.

The cutting machine 10 comprises a feed table 11 provided, upstream relative to the direction of the process flow, with an entry ramp 12 for supplying the scraps S. For this purpose, the upper surface of the table 11 and of the ramp 12, intended to come into contact with the material of the scraps, is made of a material which is non-adhesive with respect to the prepreg material so as to facilitate sliding thereof on the table before and after cutting and also facilitate cutting and prevent contamination of the treated material. A material which may be used for the upper surface of the table 11 and of the ramp 12 is, for example, polyethylene. The entry ramp 12 facilitates manual introduction of the material to be treated into the cutting machine 10.

FIG. 1 shows a plan view of a scrap S arranged on the feed table 12 at the inlet of the cutting machine 10. The feeding direction of the scrap S is indicated by the arrow y1. The scrap S is made of prepreg material (with a resin having a certain tack level, in particular an unpolymerized thermosetting resin) with continuous fibres, which fibres may be in the form of unidirectional or woven fibres.

The cutting machine 10 also comprises a cutting and drive roller 13 which is designed to feed the input material S along the feed table 11 and is also provided with circular blades 13a for separating the fibres of the scraps S, creating strips S1 of predetermined width. The shaft 13b of the roller 13 is mounted rotatably on a frame 14 of the cutting machine 10 and is driven into rotation by a motor 13c. Pressure cylinders 13d are also provided, which rest on the roller 13 so as to impart to the circular blades 13a the necessary pressure for cutting. The cylinders 13d are mounted on a shaft 13e which is idly on the frame 14.

Moreover, a pressure roller 15 (shown only in FIG. 4) is arranged downstream of the cutting roller 13 and is designed to press the strips S1 on the table 11 so as to facilitate the cutting operation. The pressure roller 15 is idle on a shaft (not shown) connected to the frame 15.

The cutting machine 10 also comprises, downstream of the pressure roller 15, a rotating blade 16 arranged transversely with respect to the feeding direction y of the material S1. This blade 16 is rotatably supported by a support 16a which is fixed to a slide 16b able to move transversely with respect to the feeding direction y along a guide 16c arranged on the frame 14. The slide 16b is driven into translation by a motor (not shown). The movement of the slide 16b causes the rotating blade 16b to roll on the feed table 11. The transverse movement of the rotating blade 16b causes cutting of the strips S1, producing cut fragments S2 which have a mainly rectangular shape (except for any fragments obtained from the edge portions of the scraps).

The movement of the rotating blade 16 is coordinated with the rotation of the cutting roller 13 (and therefore with the feeding of the material to be cut) so as to obtain the required size of the cut fragments S2.

A sensor 20, for example a digital video camera, able to record the overall area of the scraps S forming the input charge supplied to the machine 10 is provided at the inlet of the cutting machine 10. The data recorded by the sensor 20 are processed by a control unit 21 which uses these data to control the process according to the invention in the manner which will be described below. In fact, since the scraps have a different and non-controllable shapes, generally each charge of material entering the cutting machine 10 may be different, in terms of quantity of material, from the previous one. Assuming that the scraps are supplied to the cutting machine 10 one at a time, or in a certain number at a time (provided that there is no overlapping between one scrap and another one), the signal supplied for each charge might indicate the percentage amount (or fraction) of a (reference) entry area IA of the machine which is occupied (for example the area of the upper surface of the entry ramp 12). For example, should the charge consist of a rectangular scrap in one piece with an area equal to the entry area of the machine (assumed to be rectangular), this percentage would obviously be 100% (considering the scrap arranged so as to coincide with the entry area of the machine). Should, on the other hand, the charge consist of a scrap in the shape of a right-angled triangle, with the catheti respectively equal to the sides of the entry area of the machine, the percentage of occupation would be 50% (considering the scrap arranged such that the catheti coincide with the sides of the entry area of the machine). Obviously, in the case where the charge is composed of more scraps the percentage of the entry area occupied depends on the sums of the areas of the scraps. Should, however, the charge have dimensions exceeding the length of the entry area relative to the feeding direction y1, it may be assumed that the sensor 20 performs several recordings in succession so as to cover the entire length of the charge. With this operating way the sensor may thus be coordinated also with a possible automated supply system, as an alternative to the manual system described in the example illustrated here.

Figure 2:
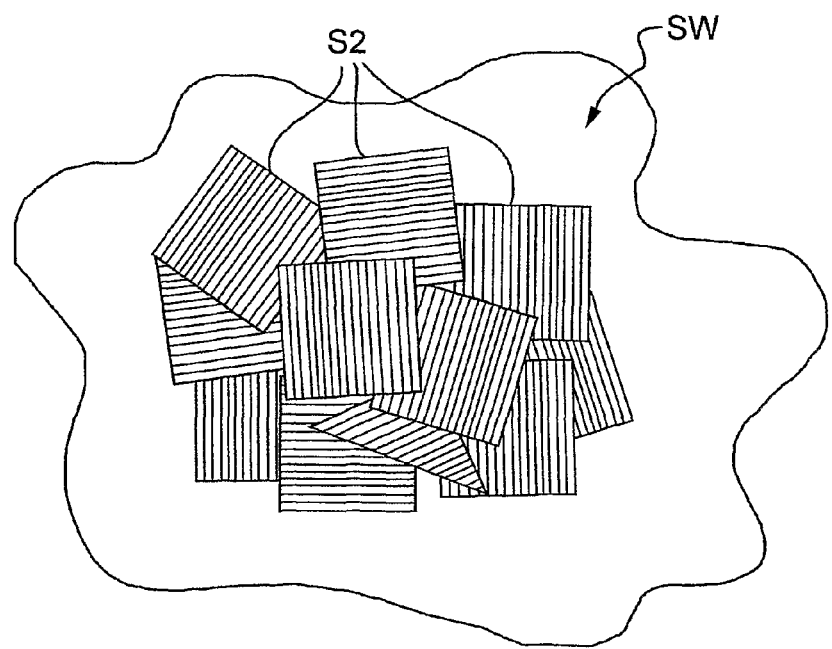
FIG. 2 is a plan view on a larger scale showing the structural configuration of the recycled prepreg material obtained according to the invention.

The method according to the invention therefore envisages that the cut fragments S2 are distributed randomly on the strip of advancing backing material SW, resulting in a configuration such as that shown in FIG. 2 (the lines shown on each fragment S2 indicate the direction of the fibres). The backing material of the strip SW is a backing paper suitable in general for the prepreg starting material, for example polyethylene. The random distribution of the cut fragments S2 on the strip of backing material SW is such that the fibres are distributed in a near-isotopic manner with respect to the surface of the strip of backing material.

Figure 5:
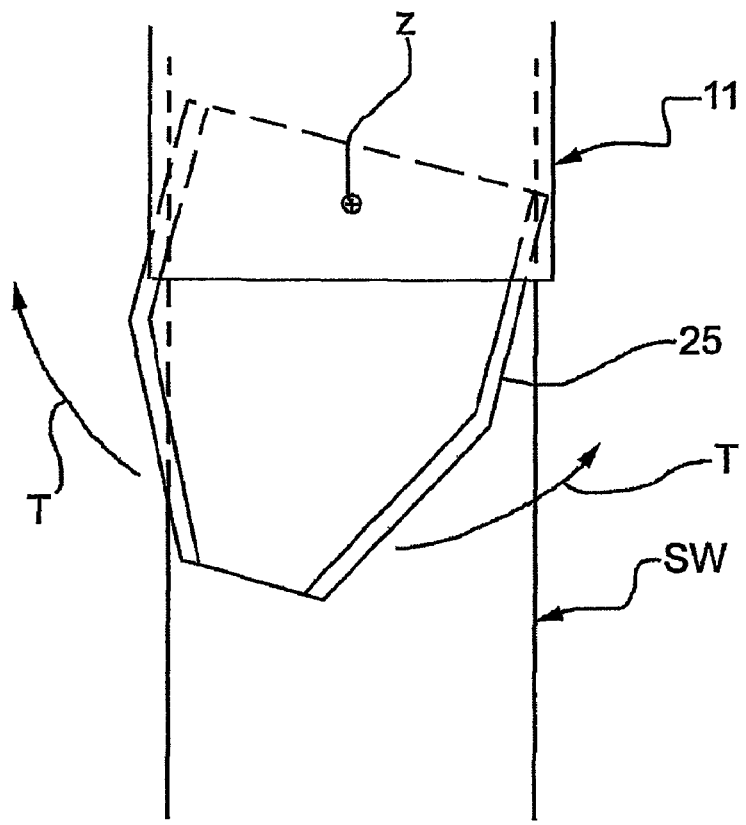
FIG. 5 is a schematic plan view which shows a component of the apparatus of FIG. 4.
Figure 6:
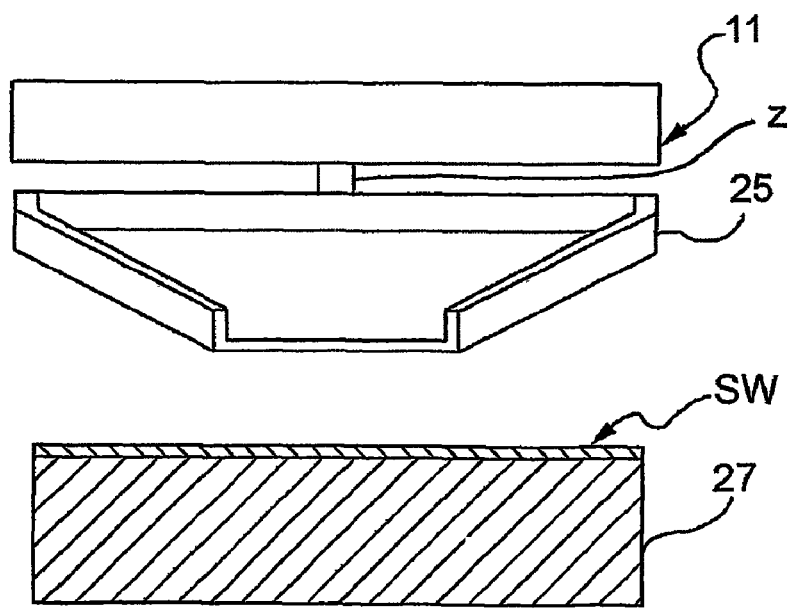
FIG. 6 is a schematic front view which shows the component of FIG. 5.

In order to obtain this distribution, a chute or hopper 25 and a blower 26 are associated to the cutting machine 10 and are arranged downstream of the cutting blade 16 and at the forward end of the feed table 11, while the strip of backing material SW is arranged so as to pass underneath the forward end of the feed table 11, supported by a support table 27. The chute 25, arranged underneath the forward end of the feed table 11, is designed to collect the cut fragments S2 of the cutting machine 10 and conventionally comprises an inclined plane bounded by lateral guide shoulders (see also FIGS. 5 and 6). The chute 25 is configured so as to have a flow area decreasing in the direction of movement of the cut fragments S2. The chute 25 is imparted a movement at a controlled speed, transverse with respect to the feeding direction y2 of the strip of backing material SW; in the example shown, this movement is an oscillating movement (indicated by the arrows T) about a vertical axis z, obtained under control of motor-driven means (not shown). The chute 25 allows a distribution of the fragments which is random in terms of direction, but homogeneous in terms of quantity of material per unit of surface area. The blower 26, which is arranged above the chute 25 at the forward end of the cutting table 11, is supplied with low-pressure compressed air; it is designed to blow on the group of cut fragments S2, facilitating falling thereof with a random orientation onto the chute 25 and then onto the underlying strip of backing material SW. This arrangement aims at favouring the random arrangement of the fibres; without the blower 26 most of the fragments S2 might fall onto the chute 25 retaining the initial orientation of the fibres.

The feeding speed of the strip of backing material SW is determined by the speed of rotation of a winding roller 30 around which the strip is finally wound together with other components, as will be described in greater detail below. The winding roller 30 is driven into rotation by a motor 31. At the other end, the backing strip is unwound from an idly mounted supply reel 32. The strip leaving the supply reel is guided by an idle cylinder 33 on the support table 27. The feeding speed of the strip of backing material SW is adjusted depending on the recorded area of the incoming scraps, so that the cut fragments S2 form a substantially homogeneous layer also in the feeding direction of the strip SW. For this purpose, the control unit 21 controls the motor 31 which drives the winding roller 30 on the basis of the data made available by the sensor 20. This measure is necessary since, as mentioned above, the scraps S to be treated have different geometric shapes (generally combinations of rectangles and triangles) and different sizes. In particular, should the data processed by the control unit be configured as a percentage of the entry area IA of the cutting machine occupied by the charge of scraps, the motor 31 of the winding roller 30 could be controlled so as to set a maximum speed for the winding roller 30 when the percentage of occupation is equal to or close to 100% and to reduce this speed in a manner dependent on (for example proportional to) the percentage of occupation when the latter is less than 100% (in other words, the speed of the winding roller, and therefore of the strip, would be an increasing monotone function of the fraction of occupation).

The method according to the invention envisages moreover arranging a strip of protective material PW over the cut fragments S2 distributed on the strip of backing material SW. Materials suitable for this strip are those which are commonly used with the same aim for preipreg materials, for example polyethylene.

The strip of protective material PW together with the cut fragments S2 and the strip of backing material SW are then compacted on the support table 27 so as to form a strip of recycled prepreg material DW which has substantially constant area weight and thickness in the direction of its length.

Said compaction is performed by means of a compaction roller 34 which compresses the strip of protective material PW, the cut fragments S2 and the strip of backing material SW on the support table 27 while they are fed together on the latter. For this purpose, the compaction roller 34 is idly mounted, but is arranged so as to allow a desired pressure to be exerted on the underlying strip. The compaction allows to consolidate the various cut fragments S2 into a layer of recycled material which is as coherent as possible and thus allows to obtain an assembly which may be rolled up in the form of a roll of recycled material.

The strip of recycled prepreg material DW thus formed is, finally, wound around the winding roller 30. The feeding speed of the strip of protective material PW which, downstream of the compaction roller 34, becomes part of the strip of prepreg material DW, is therefore also determined by the speed of rotation of the winding roller 30.

At the other end, the protective strip PW is unwound from an idly mounted supply reel 35. The strip leaving the supply reel 35 is guided by an idle cylinder 36 towards the compaction roller 34. A further idle cylinder 37 is provided downstream of the compaction roller 34 in order to guide the strip of prepreg material DW towards the winding roller 30.

At the end of the cutting and rolling-up process the material obtained in the form of a roll, suitably packaged inside a sealed, moisture-proof, plastic wrapping, may be stored in a refrigerator in the same manner as the original prepreg material.

In particular, in order to ensure the traceability of the material obtained as regards the residual time of exposure to room temperature and expiry of the material, the following procedure will be adopted:

the batch of rolls from which the scraps are to be recycled is defined;

the roll with the shortest residual exposure time is identified—this will be the residual exposure time for the rolls obtained from the scraps;

the roll with the nearest expiry date is identified—this will be the expiry date for the rolls obtained from the scraps;

these data, together with the data obtained from the documents relating to the original rolls, will form the documentation for traceability of the rolls obtained from the scraps.

At the time of use, the material, after defrosting, is unwound and stratified in the same manner as the starting preipreg material. In particular, it may be stratified directly on forming tools or may be pre-stratified into flat laminates which may be hot-formed on forming tools by means of processes which use heat and vacuum.

Owing to the fact that the material consists of fragments of limited size (the inventors have carried out a number of tests using square-shaped fragments with a side length of 20 mm), which therefore have a limited fibre length, it is possible to form parts with a complex shape which cannot be obtained using long-fibre prepreg material. Obviously the product obtained with the recycled material will have structural characteristics which are lower than those obtainable with long-fibre prepreg materials, but which are in some cases acceptable for the application.

The same material may be used to form parts or tools in which the final shape is obtained by means of mechanical milling of the surface. In fact, owing to the isotropy obtained with the random arrangement of the broken fibres, it is possible to remove the material without the release of excessive residual stresses which would occur in the case of machining of rolled sections obtained from continuous-fibre material.

The process for preparation of the vacuum bag and the curing process in autoclave of the recycled material are the same as those for the original material.

The method illustrated above has been described with reference to prepreg thermosetting materials. The invention, however, is also applicable to some types of prepreg thermoplastic materials which have a certain tack level at room temperature. At present there are commercially available materials with a layer of amorphous thermoplastic film which satisfy this requirement and which can therefore be recycled using the method according to the invention.

The invention claimed is:

1. Method for manufacturing a recycled prepreg material in strip form, composed of fibre sections embedded in a resin matrix, said method comprising the following steps:

supplying an input charge of flat scraps from a prepreg starting material composed of continuous fibres embedded in a tack resin matrix, recording the overall area of the scraps of said input charge;

fragmenting said scraps by cutting so as to obtain cut fragments of predetermined size;

supplying a strip of backing material and a strip of protective material, which are fed at a controlled feeding speed;

distributing in a random manner said cut fragments on said strip of backing material, the feeding speed of said strip of backing material being adjusted depending on the recorded area of the incoming scraps, so that said cut fragments form a substantially homogeneous layer in which the fibres are distributed in a near-isotropic manner with respect to the surface of the strip of backing material;

arranging said strip of protective material over the cut fragments distributed on the strip of backing material; and compacting said strip of protective material, cut fragments and strip of backing material so as to form a strip of recycled prepreg material which has a substantially constant area weight and thickness.

2. Method according to claim 1, wherein said fragmentation step comprises: cutting said scraps being fed into parallel strips and then transversely cutting said strips to obtain said cut fragments.

3. Method according to claim 2, wherein said scraps are caused to slide along a feed table by a cutting and drive roller provided with circular blades, said roller conveys said scraps and at the same time cuts them into parallel strips and wherein said strips are cut transversely by a rotating blade movable transversely with respect to the feeding direction of the scraps.

4. Method according to claim 1, wherein said random distribution of the cut fragments on the strip of backing material is performed by gravity conveyor means, which are designed to collect the cut fragments and are movable with an alternating motion in a direction transverse with respect to the feeding direction of the strip of backing material, and by a blower designed to blow on the cut fragments, facilitating falling thereof with a random orientation onto the gravity conveyor means and then onto the underlying strip of backing material.

5. Method according to claim 1, wherein said strip of recycled prepreg material is wound around a motor-driven winding roller and wherein the feeding speed of the strip of backing material is adjusted by adjusting the speed of rotation of the winding roller.

6. Method according to claim 1, wherein the overall area of the scraps in the input charge is optically recorded.

7. Method according to claim 1, wherein recording of the overall area of the scraps of said input charge provides a signal indicating the fraction of an entry reference area occupied by the charge and wherein the feeding speed of the strip of backing material is controlled to be maximum when said occupied fraction is equal to about 1 and to be an increasing monotone function of the occupied fraction when the occupied fraction is less than 1.

8. Method according to claim 1, wherein said resin is an unpolymerized thermosetting resin.

* * * * *